United States Patent [19]

Murakami et al.

[11] Patent Number: 4,627,944
[45] Date of Patent: Dec. 9, 1986

[54] METHOD FOR PRODUCING A CARBON SHEET AND A FUEL CELL SEPARATOR

[75] Inventors: Shigeru Murakami; Yasuto Komatsu, both of Omachi; Makoto Watanabe, Tokyo; Takeo Uemura, Omachi, all of Japan

[73] Assignee: Showa Denko Kabushiki Kaisha, Tokyo, Japan

[21] Appl. No.: 642,322

[22] Filed: Aug. 20, 1984

[30] Foreign Application Priority Data

Aug. 19, 1983 [JP] Japan ................................ 58-150360

[51] Int. Cl.$^4$ ........................ B29C 25/00; C01B 31/02
[52] U.S. Cl. ................................. 264/29.4; 264/29.1; 264/129; 264/37; 423/447.1; 423/447.7; 423/445; 423/449
[58] Field of Search .................... 264/29.1, 29.2, 29.4, 264/37, 129; 423/447.1, 447.7, 447.6, 445, 449

[56] References Cited

U.S. PATENT DOCUMENTS

| | | | |
|---|---|---|---|
| 3,233,014 | 2/1966 | Bickerdike et al. | 264/29.1 |
| 3,238,054 | 3/1966 | Bickerdike et al. | 264/29.1 |
| 3,281,261 | 10/1966 | Lynch | 264/29.2 |
| 3,619,139 | 11/1971 | Dixon et al. | 264/29 |
| 3,927,157 | 12/1975 | Vasterling | 264/29 |
| 3,969,124 | 7/1976 | Stewart | 264/29.1 |
| 4,012,476 | 3/1977 | Mizuma | 264/29.1 |
| 4,080,413 | 3/1978 | Layden et al. | 264/29.2 |
| 4,152,482 | 5/1979 | Reynolds | 264/29.2 |
| 4,165,349 | 8/1979 | Sandelli | 264/29.1 |
| 4,226,816 | 10/1980 | Yamamoto | 264/29.4 |
| 4,291,794 | 9/1981 | Bauer | 264/29.4 |
| 4,350,672 | 9/1982 | Layden et al. | 264/29.1 |

Primary Examiner—Jeanette Hunter
Attorney, Agent, or Firm—Sughrue, Mion, Zinn, Macpeak & Seas

[57] ABSTRACT

A carbon sheet which is suitable for use as a fuel cell separator is produced by the steps of:
  forming a shaped body in the form of a sheet comprising cellulose fibers and a thermosetting resin which is filled between the cellulose fibers; curing the thermosetting resin of the shaped body; and baking the shaped body.

6 Claims, 2 Drawing Figures

METHOD FOR PRODUCING A CARBON SHEET AND A FUEL CELL SEPARATOR

BACKGROUND OF THE INVENTION

1. Field of the Invention

The present invention relates to a method for producing a carbon sheet. The present invention also relates to a fuel cell separator.

2. Description of the Prior Art

A carbon sheet, especially a fuel cell separator, is conventionally produced by using, as the starting materials, a thermosetting resin, such as phenol resin or furan resin, and carbon fillers and by using one of the following processes:

(1) The A component is shaped into the form of a sheet and then is cured and baked.

(2) The A component and the B component are blended together, are shaped into the form of a sheet, and are cured.

(3) The A component and the B component are blended together, are shaped into the form of a sheet, are cured, and then are baked.

The A component and the B component are the thermosetting resin and the carbon fillers, respectively. It is difficult in the methods (1) and (3) to remove the volatile matter contained in the shaped bodies therefrom, and therefore the shaped bodies are liable to crack during the curing and baking steps, especially during the curing step. As a result, the yield is low in the methods (1) and (3).

Since baking is not carried out in the method (2), the electric conductivity of the product is not sufficiently satisfactory for it to be used as fuel cell separator.

Figure 1:
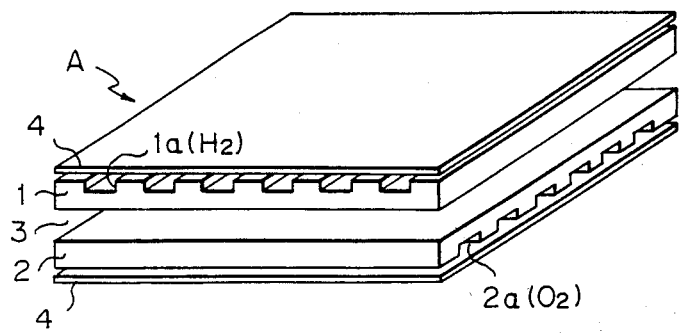
FIG. 1 shows a unit cell of a fuel cell.

The fuel cell is described with reference to FIGS. 1 and 2.

The fuel cell is a galvanic cell which directly converts the oxidation reaction of fuel to electric energy. In the fuel cell, the oxidation reaction of fuel proceeds electrochemically and the accompanying change in the free energy is directly converted to electric energy. The fuel can be $H_2$ gas and the oxidizer can be $O_2$ gas (FIG. 1). In the fuel cell using the electrochemical reaction between $H_2$ and $O_2$, phosphate solution 3 is filled between the electrodes 1 and 2, and a flexible sheet (not shown) forms a container for holding the electrodes 1 and 2 and the phosphate solution 3 therein. The electrodes 1 and 2 must be porous to allow permeation of the phosphate solution 3 therein. A catalyzer, such as Pt, is carried on the porous structure of the electrodes 1 and 2. The surface of the electrodes 1 and 2, which surface is opposite to the surface in contact with the phosphate solution 3, is provided with grooves 1a and 2a. The $H_2$ and $O_2$ gases are passed along the grooves 1a and 2a respectively, which are covered by the separators 4. The reaction between the $H_2$ and the $O_2$ is performed in the presence of the catalyzer, e.g., Pt, with the phosphate solution 3 acting as an intermediary only.

Figure 2:
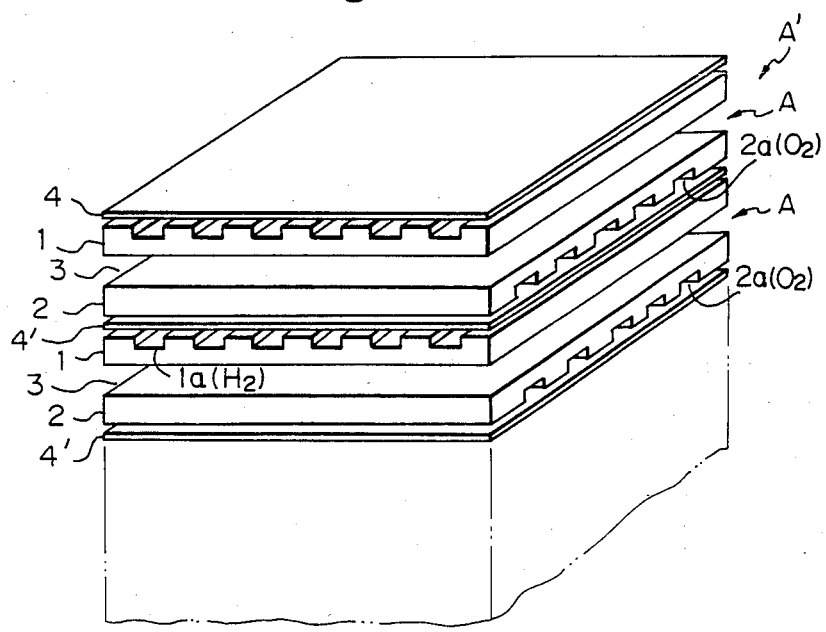
FIG. 2 shows unit cells connected in series.

Since the voltage of the single unit cell A (FIG. 1) is low, a plurality of unit cells A is connected in series as shown in FIG. 2 to form a layered cell A'.

The fuel cell is operated at approximately 200° C. Since $H_2$ gas and $O_2$ gas are flown over the upper and lower sides of the separators 4, respectively, mixing of these gases is very disadvantageous for the efficiency of a fuel cell.

Accordingly, the fuel cell separators 4 must have the following properties:

(a) The separators 4 must have a gas tightness so that the $H_2$ and $O_2$ gases do not permeate therethrough under any operating condition of the fuel cell.

(b) The separators 4 must have a high electric conductivity and be thin, e.g., from 0.5 to 2 mm, so as to allow effective power withdrawal therefrom.

(c) The separators 4 must be free of warpage and have a strength of a certain degree.

(d) The separators 4 must be corrosion-resistant against, for example, the phosphate solution (conventional metals are inappropriate as the separators 4).

(e) The separators 4 must not be expensive (Pt, Au, and other precious metals are highly corrosion-resistant but are expensive. Glassy carbon meets the requirements of (d) and (e)).

(f) The separators must have a large surface area, such as a square shape, of from 30 to 40 cm × from 30 to 40 cm.

It is difficult to produce by any one of the methods (1) through (3) warpage-free separators having a large surface area, as is described in, for example, "Ceramics" Vol. 4, No. 4, page 44 (1969).

It is also difficult by either of the methods (1) and (2) to provide the baked products with a resistivity of $10^{-1}$ $\Omega.cm$ or less.

SUMMARY OF THE INVENTION

It is an object of the present invention to remove the disadvantages of the conventional method for producing a carbon sheet and to provide a method in which thermal shrinkage of and crack formation in the shaped bodies during baking are eliminated and in which the electric conductivity of the carbon sheet is considerably enhanced.

It is another object of the present invention to provide a fuel cell separator which, meets the above-mentioned requirements and, especially, which has a high electric conductivity, is free of warpage, and has a high strength.

In accordance with the objects of the present invention, there is provided a method for producing a carbon sheet, comprising the steps of:

forming a shaped body in the form of a sheet comprising cellulose fibers and a thermosetting resin which is filled between the cellulose fibers;

curing the thermosetting resin of the shaped body; and baking the shaped body. The shaped body may additionally comprise carbon fillers which are filled between the cellulose fibers.

The fuel cell separator according to the present invention consists of a carbon sheet produced by the method mentioned above.

The cellulose fibers suppress, during the curing and baking steps, the formation of cracks and warpage of the shaped body so that a carbon sheet which is suitable as a fuel cell separator can be produced at a high yield.

The carbon fillers considerably enhance the electric conductivity of a carbon sheet.

DESCRIPTION OF THE PREFERRED EMBODIMENTS

The cellulose fibers are fibers having a high content of fibrous cellulose. A fibrous cellulose paper, especially filter paper, is a preferred embodiment of the cellulose fibers.

The thermosetting resin may be phenol resin, furan resin, or blended resin, preferably phenl resin or furan resin. The phenol resin includes modified resin with dryoil, such as tung oil or linseed oil.

The weight proportion of the thermosetting resin to the cellulose fibers ranges preferably from 100:25 to 100:70, more preferably from 100:30 to 100:40. When the weight proportion of the thermosetting resin to the cellulose fibers falls within one of these ranges, crack formation during the baking step is drastically suppressed, the thermosetting resin is uniformly impregnated into the cellulose fibers, and the gas tightness of the products is enhanced. It appears that within the above-mentioned ranges the shrinkage behavior of the thermosetting resin and the shrinkage behavior of the cellulose fibers are well balanced during baking.

In order to fill the thermosetting resin in the cellulose fibers, e.g., a fibrous cellulose paper, the cellulose fibers are dipped in the thermosetting resin liquid in such a manner that the cellulose fibers are thoroughly impregnated with the thermosetting resin.

It is preferred that the fibrous cellulose paper be dried and then dipped into the thermosetting resin-bearing liquid. In this case, the water is removed from the paper. The water removal improves the mutual wettability of the fibrous cellulose paper with respect to the thermosetting resin and thus smoothens the impregnation of the thermosetting resin into the fibrous cellulose paper. Preferably, during the curing step, the shaped body is sandwiched between plates, such as graphite or stainless steel plates and is subjected to a static pressure in the range of from approximately 1 kg/cm$^2$ to 100 kg/cm$^2$ over a period of from 10 minutes to 20 hours. The time for pressure application is preferably from 15 minutes to 20 hours when the shaped body comprises the carbon fillers.

Baking is carried out to carbonize the shaped body and is preferably carried out at a temperature of from 800° C. to 1200° C. for a period of from 50 to 400 hours.

The shaped body comprising the carbon fillers can be cured and baked as described above. The carbon fillers may be in any form, such as powder or fiber. Graphite powder is a preferable carbon filler. When the carbon fillers are in the form of powder, the grain size is preferably up to 74 $\mu$m, more preferably from 74 to 2 $\mu$m. The content of the carbon fillers in the shaped body is preferably from 3% to 25% by weight. If the content of the carbon fillers exceeds 25% by weight, the structure of the product tends to be poorly bonded locally since the adhesive property of the carbon fillers to the thermosetting resin is poor as compared with that of the cellulose fibers. On the other hand, if the content of the carbon fillers is less than 3% by weight, enhancement of the electric conductivity is not apparent.

The carbon fillers can be pre-mixed with the thermosetting resin or can be preliminarily incorporated into the cellulose paper and then the thermosetting resin can be impregnated into the cellulose paper. In order to simplify the manufacturing step of the impregnated body, the cellulose fibers are dispersed in a mixture of the thermosetting resin and its solvent, and the obtained dispersion mixture is manufactured into paper. The solvent may be water, alcohol, or the like and may be used in an amount of from 20% to 40% by weight based on the total amount of the solvent and the thermosetting resin. The present invention is hereinafter explained by way of Examples.

EXAMPLE 1

Several pieces of the fibrous cellulose filter paper (produced by Toyo Filter Paper under the trade name of No. 526; pore diameter: 3 to 8 $\mu$m; cellulose content: 100%; size: 300 cm $\times$ 300 cm $\times$ 1 mm square shape)) were dried at 120° C. for 24 hours. The fibrous cellulose filter paper was then thoroughly impregnated with thermosetting furan resin (produced by Kao Soap under the trade name of VL 211). Excessive resin deposited on the surfaces of the fibrous cellulose filter paper was removed therefrom. The single sheet of the resin-impregnated filter paper was sandwiched between two pieces of release paper, and the release paper was sandwiched between straight plates having a smooth surface. A static pressure of 1 kg/cm$^2$ was applied to the filter paper, and curing of the thermosetting resin was carried out for 3 hours during the pressure application. The straight plates and the release paper were separated from the resin-impregnated filter paper, and the resin-impregnated filter paper was sandwiched between graphite plates, followed by heat treatment up to 1100° C. for 40 hours in an Ar atmosphere. The baked body was cooled down to room temperature, and the graphite plates were separated from the baked body. The resin-impregnated filter paper was completely carbonized.

The obtained carbon sheet was 0.61$\pm$0.05 mm in thickness and had a resistivity of 0.007 $\Omega$.cm. The carbon sheet was subjected to gas-leakage test in which a pressure difference of 1 atm was applied by using N$_2$ gas. The gas-leakage value was 10$^{-6}$ cm$^2$/sec. No cracks were detected on the carbon sheet. The carbon sheet had satisfactory properties for use as a fuel cell separator.

EXAMPLE 2

Fine graphite fillers having a grain size of 44 $\mu$m or less were uniformly distributed over one of the surfaces of the fibrous cellulose filter paper used in Example 1 by sucking the graphite fillers from the other surface of the filter paper. The amount of fine graphite fillers was 5% by weight based on the total weight of the fine graphite fillers and the filter paper. The graphite-bearing filter paper was dried in a constant-temperature bath at 110° C. for 24 hours.

The fibrous cellulose filter paper was then thoroughly impregnated with thermosetting phenol resin. The single sheet of resin-impregnated filter paper was sandwiched between two pieces of release paper, and the release paper was sandwiched between straight plates having a smooth surface. A static pressure of 1.5 kg/cm$^2$ was applied to the filter paper, and curing of the thermosetting resin was carried out for 3 hours during the pressure application. The straight plates and the release paper were separated from the resin-impregnated filter paper, and the resin-impregnated filter paper was sandwiched between graphite plates, followed by heat treatment up to 900° C. for 40 hours in an Ar atmosphere. The baked body was cooled down to room temperature, and the graphite plates were separated from the baked body. The resin-impregnated filter paper was completely carbonized.

The obtained carbon sheet was 0.65±0.05 mm in thickness and had a resistivity of 0.007 Ω.cm. The carbon sheet was subjected to a gas-leakage test in which a pressure difference of 1 atm was applied by using $N_2$ gas. The gas-leakage value was $10^{-6}$ cm$^2$/sec. No cracks were detected on the carbon sheet. The carbon sheet had satisfactory properties for use as a fuel cell separator.

We claim:

1. A separator of a fuel cell produced by a method, comprising the steps of:

forming a shaped body in the form of a single sheet comprising cellulose fibers and a thermosetting resin which is filled between the cellulose fibers;

curing the thermosetting resin of the shaped body; and baking the shaped body at a temperature of from 800 to 1200° C., thereby converting the thermosetting resin into carbon.

2. A separator according to claim 1, wherein the cellulose fibers are in the form of a paper.

3. A separator according to claim 1, wherein the thermosetting resin is a furan resin or a phenol resin.

4. A separator according to claim 1, wherein the weight proportion of the thermosetting resin to the cellulose fibers ranges from 100:25 to 100:70.

5. A separator according to claim 1 wherein, during the curing step, the shaped body is subjected to a static pressure in the range of from approximately 1 kg/cm$^2$ to 100 kg/cm$^2$ over a period of from 10 minutes to 20 hours.

6. A separator according to claim 1 wherein the fibrous cellulose paper is dried and then dipped into a thermosetting resin-bearing liquid.

* * * * *